(No Model.) 3 Sheets—Sheet 1.

E. J. O'BRIEN.
COTTON SEED LINTER.

No. 433,874. Patented Aug. 5, 1890.

WITNESSES:
N. R. Davie
C. Sedgwick

INVENTOR:
E. J. O'Brien
BY
Munn & Co.
ATTORNEYS (No Model.) 3 Sheets—Sheet 2.

E. J. O'BRIEN.
COTTON SEED LINTER.

No. 433,874. Patented Aug. 5, 1890.

WITNESSES:
W. R. Davis.
C. Sedgwick

INVENTOR:
E. J. O'Brien
BY
Munn & Co.
ATTORNEYS (No Model.) 3 Sheets—Sheet 3.
E. J. O'BRIEN.
COTTON SEED LINTER.
No. 433,874. Patented Aug. 5, 1890.
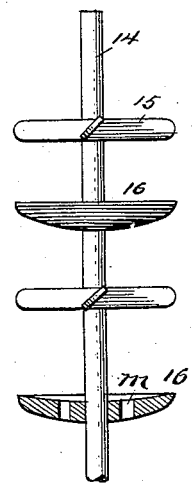
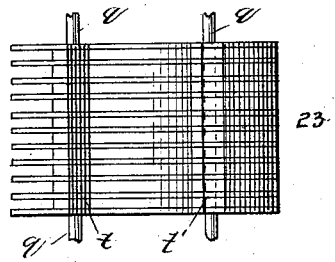
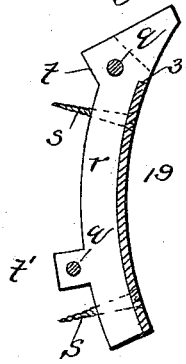
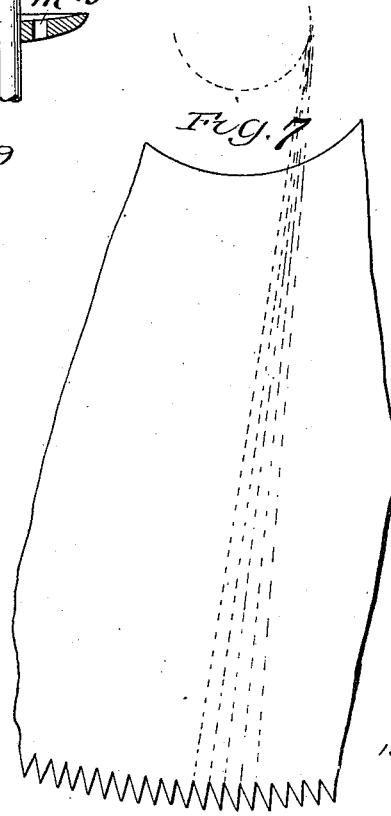
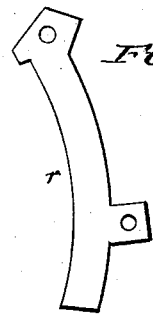
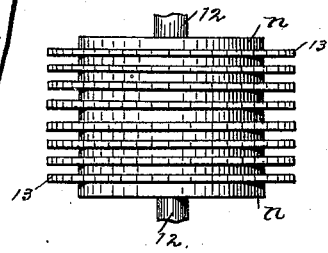
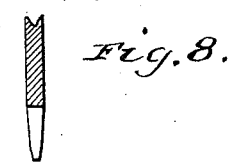
WITNESSES:
W. R. Davis.
C. Sedgwick
INVENTOR:
E. J. O'Brien
BY
Munn & Co.
ATTORNEYS

UNITED STATES PATENT OFFICE.

EDWARD J. O'BRIEN, OF TEXARKANA, TEXAS, ASSIGNOR TO CHARLES W. BREGA, OF CHICAGO, ILLINOIS.

COTTON-SEED LINTER.

SPECIFICATION forming part of Letters Patent No. 433,874, dated August 5, 1890.

Application filed December 28, 1889. Serial No. 335,240. (No model.)

*To all whom it may concern:*

Be it known that I, EDWARD J. O'BRIEN, of Texarkana, in the county of Bowie and State of Texas, have invented a new and Improved Cotton-Seed Linter, of which the following is a full, clear, and exact description.

This invention relates to cotton-seed linters of the class illustrated, described, and claimed in Letters Patent of the United States, No. 413,413, granted to me upon the 22d day of October, 1889, the main objects of the present invention being to prevent the accumulation of lint within the lint-chambers; to provide for the automatic discharge of the lint from the saw-teeth; to provide for a thorough agitation of the seed within the seed-receiving chambers, and, finally, to provide for the delivery of the stripped seed from the machine.

To the ends above named the invention consists of certain novel constructions, arrangements, and combinations of elements, all as will be hereinafter more fully explained, and specifically pointed out in the claims.

Reference is to be had to the accompanying drawings, forming a part of this specification, in which similar figures and letters of reference indicate corresponding parts in all the views.

Figure 1:
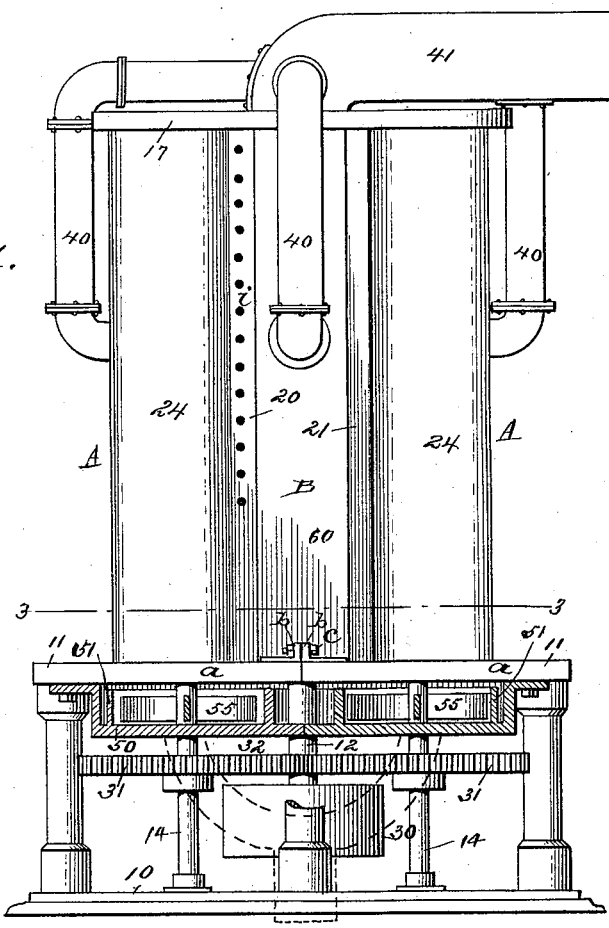
Figure 11:
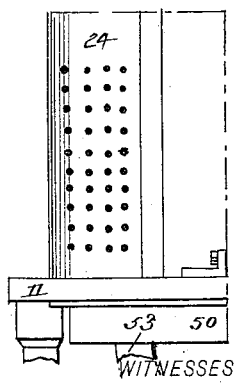
Figure 2:
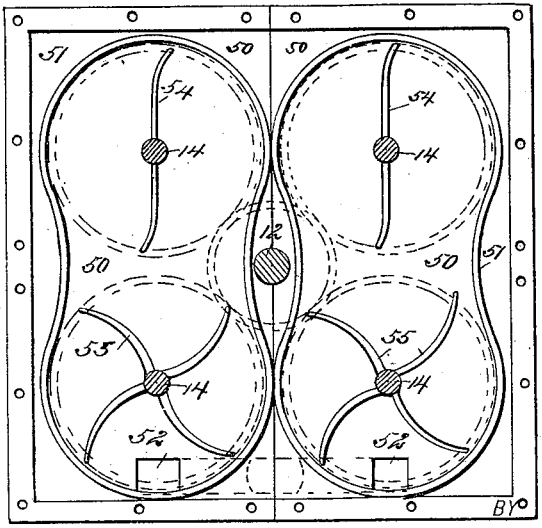
Figure 3:
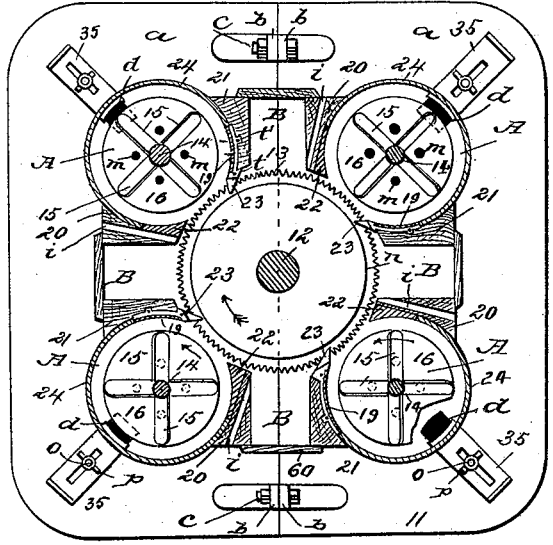
Figure 4:
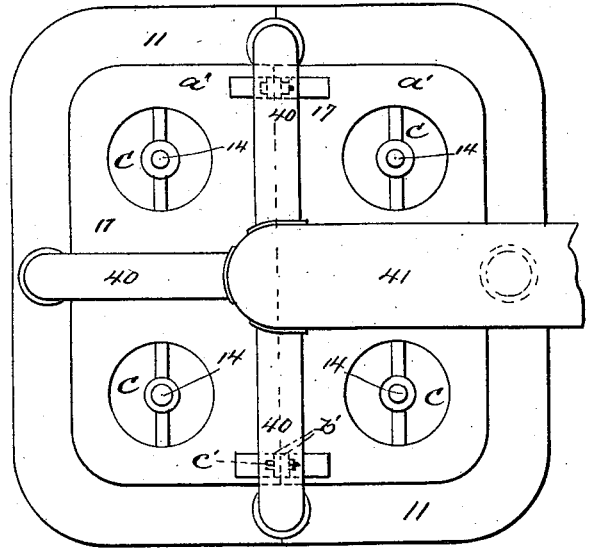

Figure 1 is a side view of my improved cotton-seed linter, parts being shown in section. Fig. 2 is a view taken just beneath the machine-table. Fig. 3 is a cross-sectional view on line 3 3 of Fig. 1. Fig. 4 is a plan view of the machine. Fig. 5 is an enlarged detail view of one of the agitator-shafts and its connections. Fig. 6 is an enlarged detailed view of a portion of one of the saw-receiving combs. Fig. 7 is a full-sized view of a portion of one of the saws. Fig. 8 is a cross-sectional view of a portion of one of the saws, this view being upon a larger scale than that employed in the presentation of Fig. 7, a larger scale being adapted to bring out the construction which it is desired to illustrate. Fig. 9 is a sectional view of the comb. Fig. 10 is a view of one of the spacing-blanks employed in the formation of the comb; and Fig. 11 is a detail view of a portion of the machine, the view being given to illustrate a modified construction. Fig. 12 is a side view of the saws and their separating-disks.

In the drawings, 10 represents the bed-plate of the machine, above which plate there is supported a table 11, such table being made in sections $a$ $a$ that are each formed with apertured lugs or projections $b$, adapted to receive clamping or binding bolts $c$, by which they are connected with each other. Upon the bed-plate 10 there is stepped a shaft 12, which carries a number of saws 13, these saws being spaced by interposed disks $n$, preferably of paper, the saws being arranged at intervals of about one-eighth of an inch. The upper end of the shaft 12 rides in bearings formed in or carried by a top plate 17, which plate is made up of sections $a'$ $a'$ that are formed with apertured projections $b'$, adapted to receive binding-bolts $c'$, by which they are connected together. The plate 17 is supported by posts 20 and 21 that extend upward from the table 11.

About the central chamber, within which the saws 13 are arranged, I form cotton-seed-receiving chambers A, through which chambers there are passed vertical shafts 14, that support agitators or beaters 15 and disks 16, said disks being formed with apertures $m$, that are located in close proximity to the shafts. The disks and agitators are alternately arranged, as shown in Fig. 5.

The walls of the chambers A are made up of the posts 20 and 21, metallic plates 22, that are secured to the posts 20, combs 23, Fig. 6, that are secured to the posts 21, and between the teeth of which the saws 13 pass, and casings 24, such casings being secured to the posts 20 and 21, the inner faces of all of the parts being curved, by preference, so that the defining-walls of the chambers A will be practically cylindrical.

The shaft 12 is provided with the pulley 30, arranged to receive a driving-belt, and the shafts 14 are each provided with a gear, as 31, the gears 31 being engaged by a gear 32, carried by the shaft 12, so that as the central shaft 12 is revolved the shafts 14 will be revolved, but in a direction opposite to that in which the shaft 12 is moving.

The bottoms of the chambers A are slotted as shown at $d$, to provide for the outward passage of the stripped or cleaned seed, the flow of the seed being regulated by slides 35 that are adjustably held to the table 11 by bolts $o$ and thumb-nuts $p$, the slide-bodies being slotted to provide for the passage of the bolts, as is clearly shown.

Between the chambers A there are formed lint-chambers B, into which chambers the lint gathered by the saw-teeth from the seed within the chambers A is thrown, owing to the peculiar formation of the saw-teeth, which formation will be presently explained; but with such an arrangement as is represented in my prior patent, above referred to, I find it difficult to prevent the banking of the lint against the posts 20. This difficulty I have found may be overcome by forming openings $i$ in the posts 20 and by connecting a suction-fan to a series of pipes 40, which lead to the lint-chambers B, the connections being established at about the relative points shown in the drawings. In this way I provide for the delivery of air to the forward inner angles of the lint-chambers at a point in close proximity to the angles formed by the meeting of the saw-teeth and the inner faces of the posts 20, whereby I provide for the drawing of the lint away from the banking-point and for the drawing of the lint from the chambers to a delivery spout or tube 41, that is connected to a fan, and to which the pipes 40 lead.

Instead of forming apertures $i$ in the posts 20, I could, under certain circumstances, aperture the lower portions of the plates 24, and in this way secure practically the same result. This modified construction is illustrated in Fig. 11. Beneath the table 11, I arrange plates 50, that are bolted to the table, as shown. These plates 50 are formed with curved flanges 51, that extend upward from the plate-bodies and fit closely against the under surface of the table, and in the plates 50 I form discharge-openings 52, in connection with which openings I arrange a discharge-chute 53. Within the chambers formed by the table, the plates 50, and their flanges 51, I arrange gathering-arms 54 and 55, the arms 54 being by preference curved to the rear, while the arms 55 are curved forward, as is clearly shown in Fig. 2. The arms 54 and 55 are arranged so as to break joint, and as the arms 54 curve backward it will be seen that the seed gathered thereby (such seed falling onto the plates 50 through the slots or openings $d$, formed, as above described, in the table 11) will be thrown into the paths of the arms 55, to be in turn gathered by such arms 55 and moved forward and over the openings 52, so that the seed will eventually pass downward through the openings 52 and into the chute 53.

Referring now to Figs. 7 and 8, it will be noticed that the forward edges of the saw-teeth are not formed upon radial lines, but are formed upon lines which incline to the rear from radial lines, so that if a line coincident with the forward edge of any tooth be extended toward the saw-axis, it will pass such axis in advance thereof, as is indicated by the dotted lines shown in Fig. 7. In this way I prevent the saw-teeth from holding the lint gathered from the seed, the centrifugal force generated by the revolution of the saws tending to throw the lint therefrom and into the lint-chambers B. To increase this effect, and at the same time to secure a tooth which will readily gather the lint, I sharpen the points of the teeth by working down the metal from either side of the face, as will be readily understood by referring to Fig. 8.

As before stated, I prefer to arrange the saws at intervals of about one-eighth of an inch, and in doing this I have found it difficult to secure a proper cast-metal comb; but I find that by making a "built-up" comb, consisting of alternately-arranged tooth and spacing plates, exceedingly satisfactory results are obtained.

In building the comb, I take metallic blanks, preferably of about the form shown in Fig. 9, and between these blanks I place other blanks, preferably cut from paper, which approximate the form of blanks $r$, (shown in Fig. 10,) the blanks being alternately arranged and united by clamping or binding bolts $q$. The metallic blanks $r$ are formed with shoulders 3, against which shoulders there is fitted a plate 19, that is apertured to provide for the passage of screws $s$, that are passed through the paper blanks $r$ and into the posts 20; and to prevent any displacement of the combs, I prefer to form them with shoulders $t$ and projections $t'$, the shoulders $t$ abutting against the inner faces of the posts 21, while the projections $t'$ enter grooves that are formed in said posts.

In operation, the seed to be treated is fed into the chambers A through openings C formed in the top plate of the machine, the shaft 12 at this time being driven so that the saws will advance in the direction of the arrow shown in connection therewith in Fig. 3. As the saws are so advanced, the shafts 14 will be advanced in the direction of their arrows, and the seed within the chambers A will be thoroughly agitated, fresh seeds being constantly presented to the action of the saw-teeth, a portion of the seed in its downward course passing through the apertures formed in the disks 16, while other portions of the seed pass outside of the disks. By providing the disks and aperturing such disks, as described, I find that the seed will move inward and outward in its passage down through the chambers A.

When it is desired to sharpen the saws, the retaining-nuts of the bolts $c$ and $c'$ are turned off and the table and top plate are separated, it being understood that the outer facing-plates 60 of the chambers B, located between the dividing-lines of the table and top plate, are removed at this time.

Having thus described my invention, I claim as new and desire to secure by Letters Patent—

1. A cotton-seed linter provided with a lint-chamber and with a system of apertures arranged to deliver air to the forward inner angle of such chamber, as and for the purpose stated.

2. A cotton-seed linter provided with a lint-chamber and with a system of apertures leading inward to a point in close proximity to the forward inner angle of such chamber.

3. A cotton-seed linter provided with a lint-chamber and with a post which forms a portion of the lint-chamber walls, such post being apertured, substantially as described.

4. A comb for cotton-seed linters, consisting of plates formed with teeth, interposed spacing-plates, and binding devices, substantially as described.

5. A comb for cotton-seed linters, consisting of plates formed with teeth, and with shoulders $t$, interposed spacing-plates, and binding devices, substantially as described.

6. A comb for cotton-seed linters, consisting of plates formed with teeth, interposed spacing-plates, binding devices, and a facing-plate, as 19.

7. A comb for cotton-seed linters, consisting of plates formed with teeth, shoulders, as $t$, and projections, as $t'$, interposed spacing-plates, and binding devices, substantially as described.

8. A comb for cotton-seed linters, consisting of metallic plates formed with teeth, interposed paper plates, and binding devices, substantially as described.

9. A saw for cotton-seed linters, wherein the forward edges of the teeth are inclined to the rear from the radial lines, and wherein the side faces of the teeth are worked down, substantially as described.

10. In a cotton-seed linter, the combination, with a structure formed with a cotton-seed-receiving chamber, a saw-cylinder chamber, and a lint-receiving chamber, of a vertical shaft, saws carried thereby, a second vertical shaft arranged within the seed-receiving chamber, agitators and disks carried thereby, and an operating mechanism, substantially as described.

11. In a cotton-seed linter, the combination, with a structure formed with a saw-cylinder chamber, cotton-seed-receiving chambers, and lint-receiving chambers, of a saw-cylinder, shafts mounted within the seed-receiving chambers, agitators carried by such shafts, gathering-arms also carried by the shafts, and a means for driving the shafts, substantially as described.

12. In a cotton-seed linter, the combination, with a table formed with apertures $d$, of adjustably-mounted slides arranged in connection with such apertures, plates formed with upwardly-extending flanges arranged beneath the table, a structure forming a cylinder-chamber, cotton-seed-receiving chambers, and lint-chambers arranged above the table, a saw-cylinder, agitator-shafts arranged within the seed-receiving chambers, gathering-arms carried by the agitator-shafts, a discharge-chute, and a means for driving the shafts, substantially as described.

13. In a cotton-seed linter, the combination, with the saw-cylinder chamber and the cotton-seed-receiving chamber, of the saw-cylinder, an agitator-shaft having apertured disks, and means for driving the said saw-cylinder and agitator-shaft, substantially as described.

14. In a cotton-seed linter, the combination, with a saw-cylinder chamber and cotton-seed-receiving chamber, of a saw-cylinder, agitator-shaft, and gathering-arms which are carried by said agitator-shaft, and a means for driving the saw-cylinder and the agitator-shaft, substantially as described.

EDWARD J. O'BRIEN.

Witnesses:
EDWARD KENT, Jr.,
C. SEDGWICK.